Patented Mar. 31, 1942

2,277,689

UNITED STATES PATENT OFFICE 2,277,689

DIELECTRIC COMPOSITIONS

Frank M. Clark, Pittsfield, Mass., assignor to General Electric Company, a corporation of New York No Drawing. Original application March 6, 1940, Serial No. 322,599. Divided and this application November 8, 1940, Serial No. 364,864

8 Claims. (Cl. 252—63.7)

The present application is a division of my application Serial No. 322,599, filed March 6, 1940.

The present invention comprises new compositions having a combination of properties which render such compositions especially suitable for dielectric and insulating purposes in electric apparatus, and, in particular, as impregnants for electric capacitors.

In my prior United States Patent No. 2,019,337, patented October 29, 1935, I have described and claimed compositions consisting essentially of nitrochlor or other nitro-halogen derivatives of polyphenyl compounds. The compositions described in this patent are prepared by the nitration of halogenated polyphenyl compounds.

Ortho nitrodiphenyl is a crystalline solid, melting at about 37.5° C. It may be prepared by treatment of diphenyl with a nitration mixture of nitric and sulphuric acid at approximately 35 to 40° C. At 25° C. it has a dielectric constant of about 3. Even at room temperature the original capacity of such capacitors soon decreases to approximately 50 per cent of the initial value. This unhalogenated material appears to be wholly unsuitable for use as a capacitor impregnant.

The subject matter of the present divisional application comprises compositions including as one ingredient materials made by halogenating nitropolyphenyl compounds, such for example as ortho nitrodiphenyl compounds, and including as a second ingredient this type of compound in the unhalogenated state. Such compositions possess properties which are highly advantageous for the dielectric field, for example, causing capacitors impregnated therewith to have a substantially constant capacity with rise of temperature or to exhibit increasing capacity with rise of temperature.

For example, the nitrochlordiphenyl composition described in my prior patent has a dielectric constant of 7 or 8 at 100° C., 1000 cycles. The new nitrotetrachlor diphenyl products described and claimed in parent application Serial No. 322,599 and constituting a part of compositions embodying my present invention have materially higher dielectric constants under the same conditions. Other physical properties of these new nitrochlor products as, for example, high electrical resistivity also are highly advantageous, and particularly so in the high voltage field.

The chlorination of ortho nitrodiphenyl may be carried out by well known methods utilizing catalyzers such as iron or antimony or their chlorides. The time and temperature of chlorination will vary with the degree of chlorination desired and other conditions. For example, the following results were obtained with a catalyst of iron chloride ($FeCl_3$):

Table I

| Temperature of chlorination, centigrade | Per cent chlorine introduced | Preponderant isomers formed |
|---|---|---|
| 100 | 15 | Mono. |
| 100 | 26 | Di. |
| 100–125 | 34 | Tri. |
| 100–130 | 41 | Tetra. |
| 100–140 | 46 | Penta. |
| 100–225 | 53 | Hexa. |

The chlorinated products are purified by washing with an aqueous alkaline solution and by distillation, as well understood. For example, the chlorinated mixture is washed with water to remove acid reactant and reaction products, and then is filtered to remove catalyst. Thereupon, it is washed with a 1 to 3 per cent sodium hydroxide aqueous solution until neutral. The neutral product is repeatedly washed with water to remove all traces of alkali and then is carefully distilled. A distillation under reduced pressure is preferred to avoid decomposition at high temperatures. A 20 millimeter pressure is convenient.

The following properties characterize the products listed in Table I:

Table II

| | Boiling range cent. (20 mm.) | Density (temperature as given) | Color N. P. A.* | Pour point, cent. | Viscosity** | Condition at 25° C. |
|---|---|---|---|---|---|---|
| Mono | 200–217 | 1.305 (15°) | 2 | −4 | 35 | Yellow liquid. |
| Di | 220–233 | 1.400 (15°) | 2 | 7 | 44 | Yellow liquid and crystals. |
| Tri | 238–250 | 1.470 (25°) | 2½ | 18 | 51 | Yellow liquid. |
| Tetra | 250–260 | 1.490 (100°) | 2 | 31 | 73 | Yellow viscous liquid. |
| Penta | 260–270 | 1.555 (100°) | 1¾ | 48 | 112 | Yellow crystalline resin. |
| Hexa | 270–280 | 1.640 (100°) | 1½ | 55 | 725 | Semi-crystalline resin. |

*N. P. A. is an abbreviation meaning National Petroleum Association.
**Viscosity values are given Saybolt Universal units taken at a temperature of 100° C.

For some purposes a material containing about 41 per cent chlorine is preferred. This material consists largely of isomers of the tetrachlor ortho nitrodiphenyl although it may be associated with some compounds of lower and some compounds of higher chlorine content. Its electrical resistivity is high, at 25° C. being 16,600×10⁹ ohms per centimeter cube. Its dielectric constant at 25° C. is 19.9.

The chlorinated composition containing about 34 per cent chlorine and consisting largely of the trichlor ortho nitrodiphenyl has advantages over the tetrachlor product for some purposes. The electrical resistivity of this composition at 25° C. is 922×10⁹ ohms. The dielectric constant at 25° C. is 22, and at 50° C. is 19.9.

The resistivity of the new chlorination products is high in all cases. What is even more important, the dielectric constant also is high in all cases, being at 25° C. in the range of 15 to 20 for the ortho mono nitrodiphenyl chlorinated to a degree not exceeding 5 chlorine atoms, and in all instances a materially higher dielectric constant than the corresponding chlorinated product (not nitrated). In order to establish a basis for comparison of the value of new compositions embodying my invention I shall have occasion hereinafter to refer to the microfarad capacity and other characteristics of a comparison capacitor unit. A comparison capacitor of assumed fixed dimensions which contains spacers of kraft paper, when impregnated with pentachlor diphenyl has a capacity of 3 microfarads. When such comparison capacitor is impregnated with ortho nitro tetrachlor diphenyl alone (that is, unassociated with a modifying ingredient), it has at 25° C. a capacity of 4.40 microfarads and a power factor of .50 per cent.

In accordance with my present invention, the chlorinated ortho nitrodiphenyl products are associated with a modifying material whereby compositions having various new and unpredictable characteristics are found to be obtained.

As such modifying materials, I may employ various nitrated aryl polynuclear hydrocarbons, one example being dinitrodiphenyl (unhalogenated). This material in a preferred form is substantially the 2,4' dinitrodiphenyl, but may contain substantial amounts of other isomers, as for example, the 2,2' dinitrodiphenyl. The preferred product is a yellow solid having a melting point of about 75 to 80° C. Its resistivity at 25° C. is 4270×10⁹ ohms per cm³.

A wide range of proportions may be employed, the following being given as illustrative examples of mixtures of dielectric compositions, although it should be understood that my invention is not to be limited in scope to the described compositions.

Example 1

A mixture consisting by weight of 75 per cent (or 3 parts) ortho nitro tetrachlor diphenyl and 25 per cent (or 1 part) of dinitrodiphenyl has a dielectric constant at 25° C. of 30, which progressively decreases as the temperature is raised, but still being relatively high, namely, 20.8 at 100° C. When the above comparison capacitor is treated with this mixture it has at 25° C. a capacity of 4.83 microfarads. This capacity remains substantially unchanged as the temperature increases to about 100° C. The power factor of a capacitor unit impregnated with such a mixture in which the ortho nitro tetrachlor diphenyl is a major ingredient at 25° C. is .46 per cent, at 50° C. is .76 per cent, at 75° C. is 1.35 per cent, and at 100° C. is 1.30 per cent.

Example 2

A mixture consisting of equal parts of dinitrodiphenyl and ortho nitro tetrachlor diphenyl has at 25° C. a dielectric constant of 32, which decreases as the temperature rises but at 100° C. is 28.8.

The comparison unit when impregnated with this equal parts mixture had at 25° C. a capacity of 4.98 microfarads, the capacity increasing with the rise of temperature to a value at 100° C. of 5.08 microfarads. The power factor of units so impregnated is as follows:

*Table III*

| | |
|---|---|
| 25° C | .45 |
| 50° C | 1.05 |
| 75° C | 1.50 |
| 100° C | 1.42 |

Example 3

Mixtures consisting by weight of 25 parts of ortho nitro tetrachlor and 75 parts of dinitro diphenyl show the following dielectric characteristics:

*Table IV*

| Temperature, centigrade | Dielectric constant |
|---|---|
| 25 | 46.2 |
| 50 | 40.5 |
| 75 | 36.5 |
| 100 | 30.7 |

The resistivity of this mixture at 100° C. is 384×10⁹ ohms per cm³.

The following capacitor and power factor values characterize the same comparison capacitor unit impregnated with this mixture:

*Table V*

| Temperature, centigrade | Capacity in microfarads | Per cent power factor |
|---|---|---|
| 25 | 5.06 | .47 |
| 50 | 5.06 | 1.31 |
| 75 | 5.14 | 1.65 |
| 100 | 5.20 | 1.47 |

For some purposes it is advisable to mix or blend the ortho nitrochlor diphenyl compositions with alpha nitronaphthalene (unchlorinated).

Example 4

A capacitor impregnated with a mixture by weight of 75 percent of alphanitronaphthalene and 25 per cent ortho nitrochlor diphenyl is characterized by a dielectric constant which increases with a rise of temperature from 25 to 50° C., and thereafter remains nearly constant. The dielectric constant of this mixture at 25° C. is 8.9 and from 50 to 100° C. is substantially constant.

Comparison capacitor units impregnated with this mixture had the following characteristics:

*Table VI*

| Temperature, centigrade | Capacity in microfarads | Per cent power factor |
|---|---|---|
| 25 | 3.70 | 1.48 |
| 50 | 4.75 | 1.60 |
| 75 | 4.70 | 1.70 |
| 100 | 4.77 | 1.87 |

It will be observed that the capacity rises with an increase of temperature from 25 to 50° C., the power factor being relatively low and little subject to change.

EXAMPLE 5

The comparison capacitor units when impregnated with a mixture of equal parts of these two ingredients have the following characteristics:

*Table VII*

| Temperature, centigrade | Capacity in microfarads | Per cent power factor |
| --- | --- | --- |
| −5 | 4.23 | .82 |
| 0 | 4.27 | .59 |
| 25 | 4.41 | .91 |
| 50 | 4.68 | 1.26 |
| 75 | 4.67 | 1.64 |
| 100 | 4.71 | 1.95 |

EXAMPLE 6

When it is desired that capacitors containing ortho nitrochlor diphenyl should have capacities which are substantially constant over a wide range of temperatures, three parts of the nitrochlor product are associated with one part of alphanitronaphthalene to produce an impregnant giving capacitors a high efficiency which varies very little with temperature change. The comparison capacitors in this case have the following characteristics:

*Table VIII*

| Temperature, centigrade | Capacity in microfarads | Per cent power factor |
| --- | --- | --- |
| −25 | 4.61 | 6.0 |
| −5 | 4.70 | .67 |
| 0 | 4.70 | .57 |
| 25 | 4.64 | .64 |
| 50 | 4.63 | 1.02 |
| 75 | 4.61 | 1.31 |
| 100 | 4.68 | 1.78 |

The various examples given herein are to be understood as illustrative, and not as defining the limits of my invention. Similar advantages are obtained over a wider range of proportions than represented by these examples. The nitro compounds to which I have referred are illustrative of the class of polynuclear aryl compounds, but I do not wish to be limited thereto. Other nitrated polynuclear compounds may be used in lieu of those above-mentioned, for example, nitro compounds of diphenyl methane, diphenyl ethane (dibenzyl), diphenyl ketone and substitution products of those mentioned as, for example, nitrodiphenyl benzene.

What I claim as new and desire to secure by Letters Patent of the United States is:

1. A material consisting of a mixture of a substantial proportion of chlorinated ortho nitrodiphenyl and a substantial proportion of nitrated aryl polynuclear hydrocarbon.

2. A material consisting of a mixture of a substantial proportion of a chlorination product of nitrodiphenyl and a substantial proportion of dinitrodiphenyl.

3. A material consisting of a mixture of a substantial proportion of a clhorination product of nitrodiphenyl and a substantial proportion of alphanitronaphthalene.

4. A material consisting of a mixture of a substantial proportion of a chlorination product of ortho nitrodiphenyl and a substantial proportion of ortho nitrodiphenyl.

5. A composition comprising substantial proportions of a chlorination product of ortho nitrodiphenyl containing about 34 to 41 per cent chlorine and a substantial proportion of unhalogenated nitrated aryl polynuclear hydrocarbon.

6. A dielectric composition consisting by weight of a major ingredient of tetrachlor nitrodiphenyl and of a minor ingredient of a nitrated diphenyl.

7. A composition comprising by weight about 25 to 75 per cent of a chlorination product of nitrodiphenyl and 75 to 25 per cent of a nitrated diphenyl.

8. A composition which is suitable for dielectric purposes and consisting by weight of about three parts of ortho nitro tetrachlor diphenyl and one part of unchlorinated nitrated diphenyl.

FRANK M. CLARK.